(12) United States Patent
Karaki

(10) Patent No.: US 7,870,318 B2
(45) Date of Patent: Jan. 11, 2011

(54) ASYNCHRONOUS SERIAL COMMUNICATION METHOD AND ASYNCHRONOUS SERIAL COMMUNICATION DEVICE

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 11/874,640

(22) Filed: Oct. 18, 2007

(65) Prior Publication Data

US 2008/0107160 A1 May 8, 2008

(30) Foreign Application Priority Data

Nov. 2, 2006 (JP) ............... 2006-298806

(51) Int. Cl.
*G06F 13/42* (2006.01)
*G06F 13/00* (2006.01)
(52) U.S. Cl. ............ 710/105; 710/33; 709/230; 375/369
(58) Field of Classification Search ......... 710/105–106, 710/110, 30–33; 709/230–232, 236; 375/362–369
See application file for complete search history.

(56) References Cited

U.S. PATENT DOCUMENTS

| | | | | |
|---|---|---|---|---|
| 4,486,855 A | * | 12/1984 | Duke | ............ 713/600 |
| 4,539,677 A | * | 9/1985 | Lo | ............ 370/445 |
| 5,398,326 A | * | 3/1995 | Lee | ............ 711/115 |
| 6,076,160 A | * | 6/2000 | Wisor | ............ 713/1 |
| 2002/0133795 A1 | * | 9/2002 | Yamada | ............ 716/4 |
| 2009/0013100 A1 | * | 1/2009 | Lee | ............ 710/30 |

FOREIGN PATENT DOCUMENTS

| JP | A-55-143857 | 11/1980 |
|---|---|---|
| JP | A-04-319756 | 11/1992 |
| JP | A-2002-190838 | 7/2002 |
| JP | A-2003-263404 | 9/2003 |
| JP | A-2005-020308 | 1/2005 |

* cited by examiner

*Primary Examiner*—Christopher B Shin
(74) *Attorney, Agent, or Firm*—Oliff & Berridge, PLC

(57) ABSTRACT

An asynchronous serial communication method and the apparatus including a sender transmitting a one bit of serial data by firstly making a signal transition on the data line, secondly putting the one bit of serial data on the data line after a predetermined time T1 yet before another predetermined time T1+T2, and a receiver receiving the one bit of serial data by firstly detecting the signal transition on the data line and secondly capturing the one bit of serial data after a predetermined time T3 (where T3>T1+T2).

17 Claims, 13 Drawing Sheets

ASYNCHRONOUS SERIAL COMMUNICATION METHOD AND ASYNCHRONOUS SERIAL COMMUNICATION DEVICE

The entire disclosure of Japanese Patent Application No. 2006-298806, filed Nov. 2, 2006 is expressly incorporated by reference herein.

BACKGROUND OF THE INVENTION

1. Technical Field

Several aspects of the present invention relate to an asynchronous serial communication method and an asynchronous serial communication device.

2. Related Art

An asynchronous circuit has been known for about 50 years. An asynchronous state machine, a calculating machine and the like using delay elements have been developed. However, after the synchronous design method which uses the global clock signal to drive a circuit was introduced in the 1970s so many kinds of small-scale integrated (SSI) circuit and medium-scale integrated (MSI) circuit driven by the global clock signal were developed that the synchronous circuit design techniques became dominant, while the asynchronous circuit design techniques have disappeared in the industry.

Recently as the chip size increases as well as the number of transistors integrated in a chip, the heat concentration and clock skew problems caused by high-frequency clocking have become serious matters. The limitations of synchronous circuit design techniques have been realized especially with the deep-submicron technologies. JP-A-2005-020308 is an example of the related art. To solve the problems, the example discloses a serial communication method, with which it is enable to lower the electric power of clocking in a synchronous serial communication device. The penalty for reducing the power consumption is circuit cost at the receiver. Even after the synchronized clock is stopped by the transmitter, the sampling clock needs to be generated by the receiver. The sampling clock ironically can increase the power consumption at the receiver, again.

Such problems in a backdrop highlight the needs for the asynchronous circuit design techniques to realize robust low-power low-noise very-large-scale-integration circuits (VLSI). Since the asynchronous circuit is self-timed, it is excellent to adopt in order to solve the malfunction problem caused by variations in voltage and temperature as well as the clock skew problem. In addition, the asynchronous circuits have advantages of low electromagnetic emission as well as low power consumption over the synchronous counterparts.

Meanwhile, low-temperature poly-crystalline-silicon (LTPS) thin-film transistor (TFT) technology, which have been often used for liquid-crystal displays, are now ready to be used for realizing flexible VLSI devices. The asynchronous circuit design can be used to compensate variations in the characteristics of LTPS TFTs, to fix the self-heating problem that is specific to LTPS TFTs, and then to come up with robust or stably-operating devices.

Following the above-mentioned trend, various asynchronous circuits have been developed for various applications. However, since any conventional asynchronous communication method between asynchronous devices has pros and cons, no asynchronous communication method has established its position yet.

There are two communication methods using 4-phase handshaking protocol for asynchronous serial communication devices. One uses dual-rail encoding for data and the other uses bundled-data scheme. Disadvantages of the former are that three signal lines (two data lines and one control line) are required for 1-bit data communication, which means that an extra signal line is needed and that the circuit structure is complicated compared with synchronous communication methods. Disadvantages of the latter are that three signal lines (one data line and two control lines) are required for 1-bit that a communication and that the communication speed is deteriorated by a delay element.

An advantage of the present invention is to provide an asynchronous serial communication method with which the number of signal lines can be reduced while obtaining a high-speed communication to a certain extent and the size of the circuit can be reduced. Another advantage of the invention is to provide an asynchronous serial communication device thereof.

An asynchronous serial communication method according to a first aspect of the invention includes a sender transmitting a one bit of serial data by firstly making a signal transition on the data line, secondly putting the one bit of serial data on the data line after a predetermined time T1 yet before another predetermined time T1+T2, and a receiver receiving the one bit of serial data by firstly detecting the signal transition on the data line and secondly capturing the one bit of serial data after a predetermined tune T3 (where T3>T1+T2).

According to the first aspect, when a sender transmitting a one bit of serial data makes a signal transition on the data line, the receiver detects the signal transition on the data line and captures a one-bit data sent by the sender after a predetermined time. Even though each data bit is accompanied with a preceding signal transition, the overhead time can be so small that an impact on the bandwidth is negligible. Therefore, it is possible to perform an asynchronous serial communication at a high speed to a certain extent with two communication wires: a data wire and a acknowledge wire, without a control wire. According to this asynchronous serial communication method, no complicated signal processing is required so that it is possible to reduce the size of a circuit.

An asynchronous serial communication method according to a second aspect of the invention includes a sender transmitting a one bit of serial data by firstly changing a signal level of the data line from a default level to the opposite level and then putting the one bit of serial data on the data line after a predetermined time T1 yet before another predetermined time T1+T2, and a receiver receiving the one bit of serial data by firstly detecting the signal transition on the data line and secondly capturing the one bit of serial data after a predetermined time T3 (where T3>T1+T2).

In this way, it is possible to perform an asynchronous serial communication at a high-speed to a certain extent with two communication wires: a data wire and a acknowledge wire, without a control wire. According to this asynchronous serial communication method, the size of a circuit can be reduced.

An asynchronous serial communication device according to a third aspect of the invention includes a sender communication port transmitting a one bit of serial data by firstly making a signal transition on the data line, secondly putting the one bit of serial data on the data line after a predetermined time T1 yet before another predetermined time T1+T2, and a receiver communication port receiving the one bit of serial data by firstly detecting the signal transition on the data line and secondly capturing the one bit of serial data after a predetermined time T3 (where T3>T1+T2), wherein the sender communication port and the receiver communication port are coupled each other through a single data line.

According to the third aspect of the invention, it is possible to perform an asynchronous serial communication at a high-speed to a certain extent with two communication wires: a data wire and a acknowledge wire, without a control wire. According to this asynchronous serial communication method, the size of a circuit can be reduced.

An asynchronous serial communication device according to a forth aspect of the invention includes a sender communication port transmitting a one bit of serial data by firstly changing a signal level of the data line from a default level to the opposite level and then putting the one bit of serial data on the data line after a predetermined time T1 yet before another predetermined time T1+T2, and a receiver communication port receiving the one bit of serial data by firstly detecting the signal transition on the data line and secondly capturing the one bit of serial data after a predetermined time T3 (where T3>T1+T2), wherein the sender communication port and the receiver communication port are coupled each other through a single data wire.

According to the forth aspect of the invention, it is possible to perform an asynchronous serial communication at a high-speed to a certain extent with two communication wires: a data wire and a acknowledge wire, without a control wire, so that it is also possible to reduce the size of a circuit.

An asynchronous serial communication device according to a fifth aspect of the invention performs data transmission through a plurality of data wires and includes a sender communication port transmitting a word of serial multi-bit data by firstly making a signal transition on a designated data line among the data lines, secondly putting a word of serial multi-bit data on the data lines after a predetermined time T1 yet before another predetermined time T1+T2;

a receiver communication port receiving a word of serial multi-bit data by firstly detecting the signal transition on the designated data line among the data lines and secondly capturing a word of serial multi-bit data on the data lines after a predetermined time T3 (where T3>T1+T2).

According to the fifth aspect of the invention, a plurality of data lines is provided so that the sender communication ports can send a multi-bit data and the receiver ports can receive the multi-bit data. Since only one data line is used for the communication according to the asynchronous serial communication method, the size of the circuit can be reduced.

An asynchronous serial communication device according to a sixth aspect of the invention performs data transmission through a plurality of data lines and includes a a sender communication port transmitting a word of serial multi-bit data by firstly making a signal transition on a designated data line among the data lines, secondly putting a word of serial multi-bit data on the data lines after a predetermined time T1 yet before another predetermined time T1+T2;

a receiver communication port receiving a word of serial multi-bit data bay firstly detecting the signal transition on the designated data line among the data lines and secondly capturing a word of serial multi-bit data on the data lines after a predetermined time T3 (where T3>T1+T2).

According to the sixth aspect of the invention, a plurality of data lines is provided so that the sender communication ports can send a multi-bit data and the receiver ports can receive the multi-bit data. Since only one data line is used for the communication according to the asynchronous serial communication method, the size of the circuit can be reduced.

An asynchronous serial communication device according to a seventh aspect of the invention includes a sender communication port transmitting a one bit of serial data by firstly making a signal transition on the that a line, secondly putting the one bit of serial data on the data line after a predetermined time T1 yet before another predetermined time T1+T2.

An asynchronous serial communication device according to an eighth aspect of the invention includes a sender communication port transmitting a one bit of serial data by firstly changing a signal level of the data line from a default level to the opposite level and then putting the one bit of serial data on the data line after a predetermined time T1 yet before another predetermined time T1+T2.

An asynchronous serial communication device according to a ninth aspect of the invention includes a receiver communication port receiving the one bit of serial data by firstly detecting the signal transition on the data line and secondly capturing the one bit of serial data after a predetermined time T3 (where T3>T1+

In this case, the sender communication port may includes a send signal level retainer retaining the signal level of the send signal that was sent last, an inverted-signal generator generating the opposite signal level to the signal level of the send signal that was sent last, an output control signal generator generating an output control signal that has a predetermined pulse duration from an inputted sender port write signal, and a selector selecting and outputting either the signal level of the send signal that was sent last or the opposite signal level depending on the output control signal.

In this way, a complicated signal processing is not necessary and it is possible to reduce the circuit size and the current consumption.

Furthermore, the receiver communication port may include a signal change detector outputting a detection signal if the signal change detector detects the signal level change, and a read signal generator generating a data read signal after a predetermined time period past if the read signal generator reads the detection signal from the signal change detectors In this way, a complicated signal processing is not necessary and it is possible to reduce the circuit size and the current consumption.

Moreover, the asynchronous serial communication device may further include a central processing unit (CPU) controlling the sender communication port and the receiver communication port.

In this case, the CPU directly controls the sender communication port and the receiver communication port and performs the asynchronous serial communication method so that a dedicated glue-logic circuit is not necessary. Therefore it is possible to reduce the circuit size and the current consumption.

The asynchronous serial communication device may further include an optical output unit and an optical detector, and wherein the signal level is an intensity of light. In this way, it is possible to perform a long-distance communication.

In the above-described asynchronous serial communication device, the signal level may be a direction of electric current. In this way, it is possible to perform a long-distance communication.

According to this invention, the sender communication port may be coupled to a plurality of the receiver communication ports where a point-to-multipoint communication is performed.

In this way, an acknowledgement signal generated by a rendezvous circuit that synchronizes acknowledgement signals from a plurality of the receivers is input to the sender communication port.

In this way, the sender communication port can send the send data to a plurality of the receiver communication ports.

Moreover, the sender communication port may send a packet that includes a destination address, a broadcast flag and data, and the receiver communication port receives the packet.

In this way, the sender communication port can send the send data to the plurality of the receiver communication ports.

Furthermore, the receiver communication port may continue and complete the receiving operation only when an address of the receiver communication port matches the destination address or when the broadcast flag is on.

In this way, the receiver communication port confirms the destination address and the broadcast flag of the packet so that only a selected one among the plurality of the receiver communication ports can receive the packet.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

First Embodiment

Figure 1:
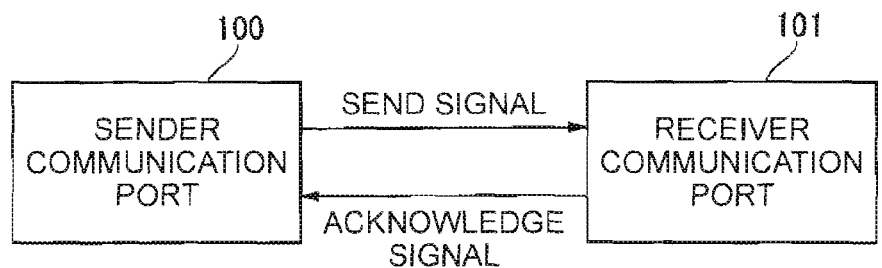
FIG. 1 is a block diagram of an asynchronous serial communication device which performs in accordance with an asynchronous serial communication method according to a first embodiment of the invention.

FIG. 1 is a block diagram of an asynchronous serial communication device which performs communication in accordance with an asynchronous serial communication method according to a first embodiment of the invention.

Referring to FIG. 1, the reference number 100 denotes a sender communication port and the reference number 101 denotes a receiver communication port. The sender communication port 100 and the receiver communication port 101 are coupled each other through a data wire (a communication wire) that transmits a send signal and through an acknowledge wire that transmits an acknowledge signal. The asynchronous serial communication device is formed in this way.

In the asynchronous serial communication device, the sender communication port 100 sends a send signal to the receiver communication port 101. The receiver communication port 101 receives the send signal and sends an acknowledge signal to the sender communication port 100. The asynchronous serial communication device performs communication according to a hereinafter described asynchronous serial communication method.

Figure 2:
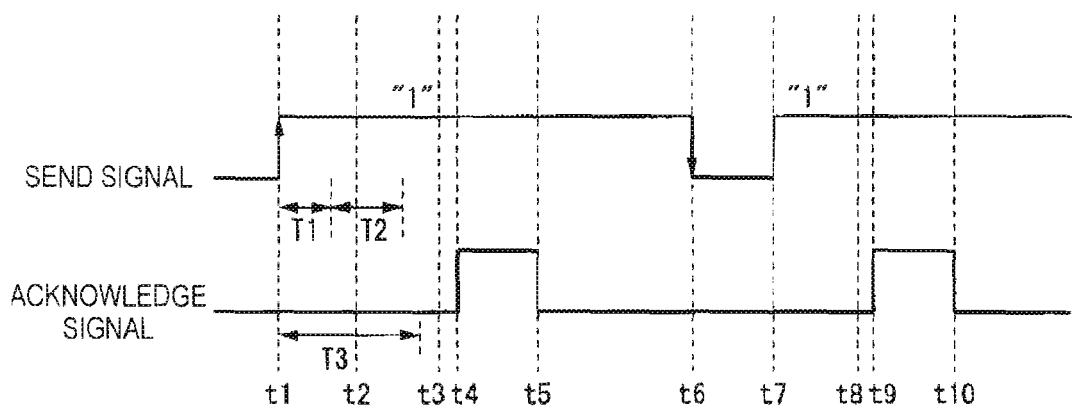
FIG. 2 is a signal wave form diagram of a send signal and an acknowledge signal showing the asynchronous serial communication method according to the first embodiment.

FIG. 2 is a wave form diagram of the send signal and the acknowledge signal in the asynchronous serial communication method according to the first embodiment. The send signal sent by the sender communication port 100 and the acknowledge signal sent by the receiver communication port 101 are shown in FIG. 2. The wave form in FIG. 2 represents a voltage level.

The sender communication port 100 firstly turns the signal level of the send signal which has been sent last to the opposite level. In this example, the signal level of the send signal is shifted from "0" (the level of the signal which has been sent last) to "1" (at time t1). At this point) the receiver communication port 101 detects the signal level shift of the send signal.

The sender communication port 100 retains the signal level "1" of the send signal for a predetermined time period (a first time period T1) or a longer time period, and it then transmits a 1-bit send data within a predetermined time period (a second time period T2). In the example shown in FIG. 2, the sender communication port 100 holds the signal level "1" of the send signal till time t2 and then sends the 1-bit send data "1" at the time t2.

After the receiver communication port 101 detected the signal level shift of the send signal (from "0" to "1") at the time t1, the receiver communication port 101 loads the above-mentioned 1-bit send data "1" after a predetermined time (a third time period T3, where T3>T1+T2) has past from the time t1 (at time t3). The acknowledge signal is then shifted to "1" (at time t4). The acknowledge signal is subsequently changed to "0" (at time t5). This change of the acknowledge signal enables the transmission of the next 1-bit send data. Transmission of the 1-bit send data is completed through the above-described process.

Transmission of another 1-bit send data starts when the sender communication port 100 turns the signal level of the send signal which has been sent last to the opposite level (time t6-t10). In the example shown in FIG. 2, the signal level of the send signal is changed from "1" (the level of the send signal which has been sent last) to "0" and the next 1-bit send data is started to be sent.

According to the asynchronous serial communication method described above, when the signal level of the send data which is sent from the sender communication port is changed, the receiver communication port detects the signal change and knows that a 1-bit send data is to arrive in a predetermined time period. The receiver communication port receives the 1-bit send data after the predetermined time period has past, and then sends an acknowledge signal which tells that the receiver communication port has received the data. Thereby, the asynchronous serial communication can be performed with only two signal lines, one is the data wire and the other is the acknowledge wire, according to the synchronous serial communication method of the embodiment. We named this communication method as a "Whipping method".

Figure 3:
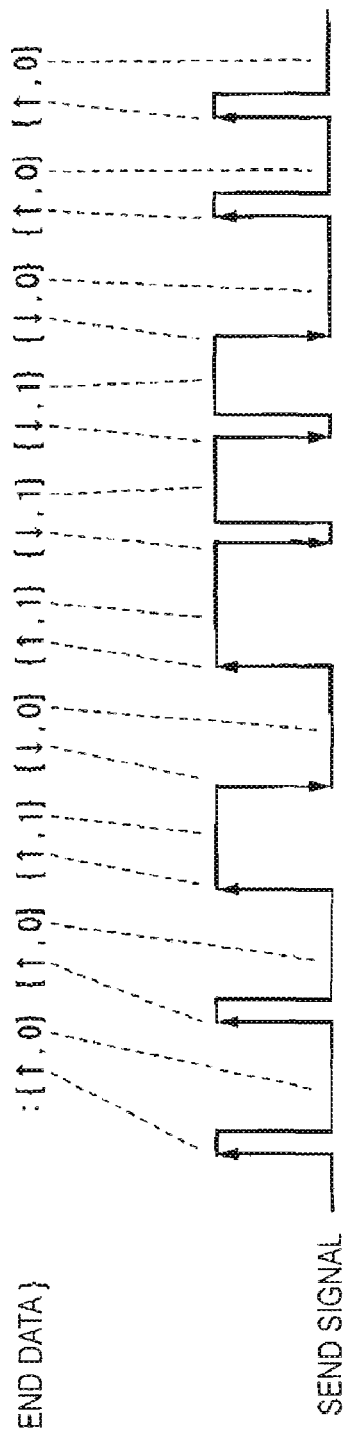
FIG. 3 is a wave form diagram of the send signal which is sent in accordance with the asynchronous serial communication method according to the first embodiment.

FIG. 3 is a signal wave form diagram of a send signal which is sent in accordance with the asynchronous serial communication method according to the first embodiment of the invention.

FIG. 3 shows an example in which a bit sequence "0010111000", is sent. According to the asynchronous serial communication method of the embodiment, the level of the send signal which was sent last is shifted to the opposite level. This shifting direction of the send signal is obtained in the following way.

A bit sequence which was sent at the end of each bit of the send data is "0001011100". A logical negation of the bit sequence is "1110100011". Here, the shift direction of the signal level toward "1" is denoted as "↑" and toward "0" is denoted as "↓" The shift direction of the signal level of the above-mentioned send signal will be sequentially designated as "↑↑↑↓↑↓↓↓↑↑".

A 1-bit send data is formed after each bit of the send signal is changed in the above-mentioned corresponding shift direction. The combinations of the shift direction and each bit of the send data can be sequentially written as {↑,0}, {↑,0}, {↑,1}, {↓,0}, {↑,1}, {↓,1}, {↓,1}, {↓,0}, {↑,0}, {↑,0}.

More specifically describing, the send signal is firstly shifted from "0" to "1" then changed to "0", which is the 1-bit send data, when the predetermined time period has past. The signal subsequently shifts from "0", which is the signal level of the send signal which has been just sent, to "1" at a predetermined time. The signal then sifts to "0", which is the 1-bit send data, when the predetermined time period has past. In the same manner, the send signal changes its level according to the above-described combinations of the shift direction and the 1-bit send data.

A configuration example of an asynchronous serial communication device is now described with reference to FIG. 4 and FIG. 5.

Figure 4:
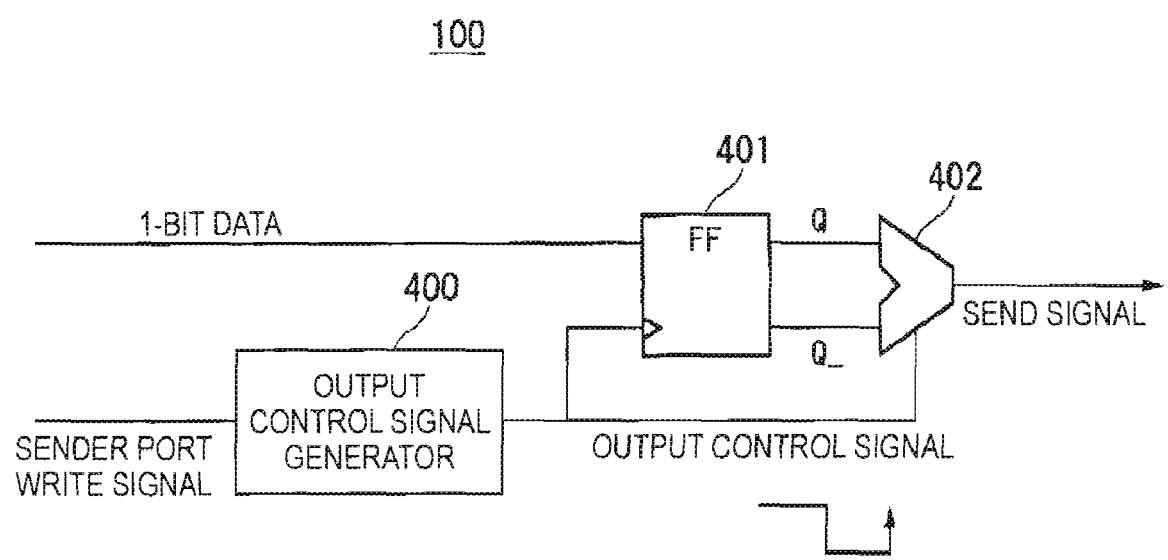
FIG. 4 is a block diagram of a sender communication port of the asynchronous serial communication device.

FIG. 4 is a block diagram of a sender communication port of the asynchronous serial communication device. Referring FIG. 4, the reference number 400 denotes an output control signal generator, the reference number 401 denotes a flip-flop and the reference number 402 denotes a two-input multiplexer.

A 1-bit data is inputted into an input terminal of the flip-flop 401 (a send signal level retainer and an inverted-signal generator). A sender port write signal is inputted into an input terminal of the output control signal generator 400. An output terminal of the output control signal generator 400 is coupled to a clock-signal input terminal of the flip-flop 401 and to a select terminal of the two-input multiplexer 402 (a selector). An output terminal of the flip-flop 401 is coupled to one of the two input terminals of the two-input multiplexer 402, and an invert output terminal of the flip-flop 401 is coupled to the other input terminal of the two-input multiplexer 402. The send signal is outputted from an output terminal of the two-input multiplexer 402.

The 1-bit data and the sender port write signal are coupled to unshown asynchronous buses. An asynchronous CPU can be coupled to asynchronous bus and the asynchronous CPU can directly control the sender communication port. The example which is hereunder described adopts the configuration in which the asynchronous CPU is coupled to the asynchronous bus.

Operation of the sender communication port in the asynchronous serial communication device is now described with reference to FIG. 5.

Figure 5:
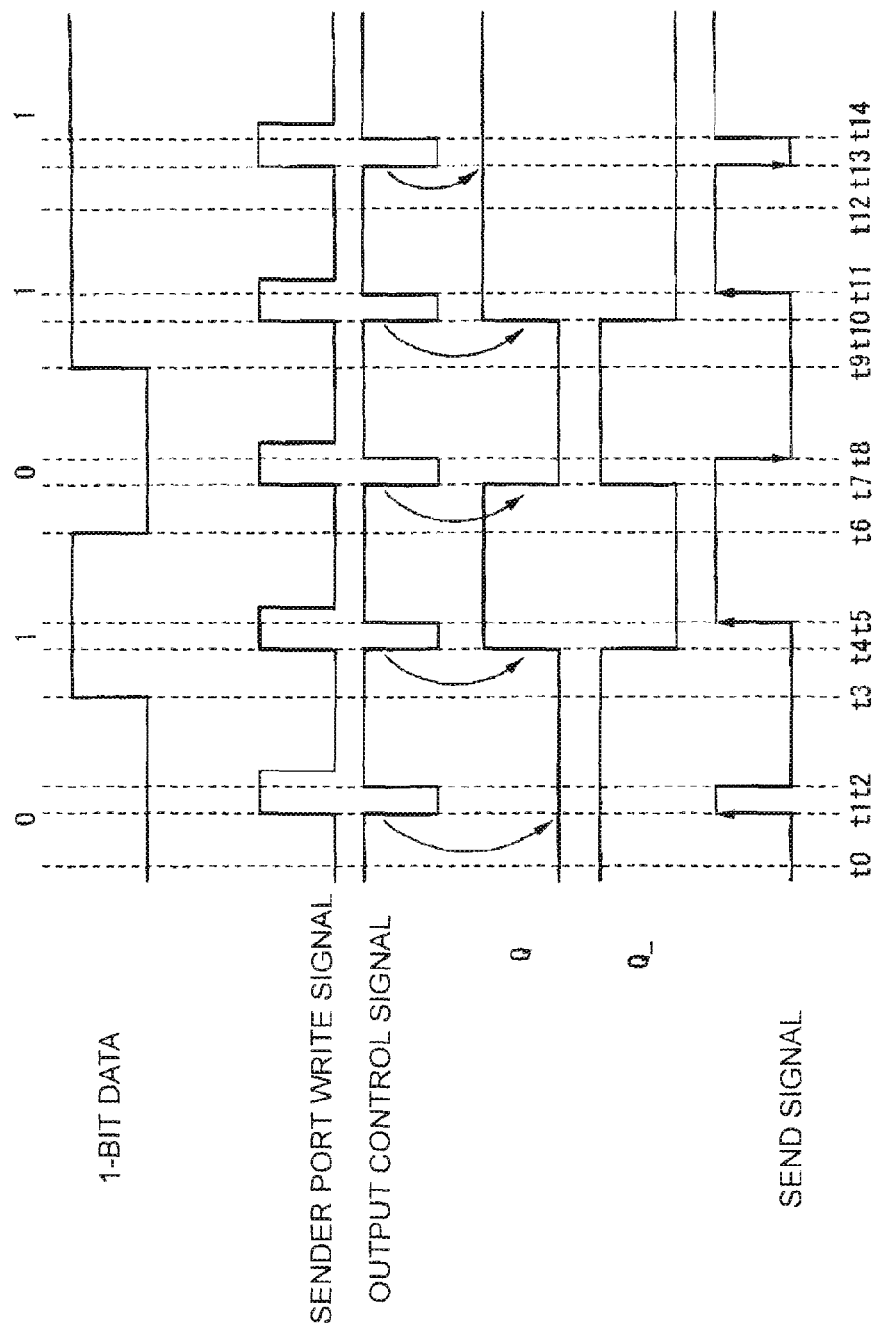
FIG. 5 is a timing chart of operation of the sender communication port in the asynchronous serial communication device.

FIG. 5 is a timings chart of the operation of the sender communication port in the asynchronous serial communication device. FIG. 5 shows an example in which "01011" is sequentially sent as the 1-bit data.

The unshown asynchronous CPU receives an acknowledge signal and then outputs the 1-bit data "0" through the asynchronous bus (at time t0). The asynchronous CPU outputs the sender port write signal whose level changes from "0" to "1" for a predetermined time period (at time t1).

The sender port write signal is inputted into the output control signal generator 400 and the output control signal generator 400 is activated. The output control signal generator 400 generates and outputs an output control signal which is a single shot pulse shifting from "1" to "0" and has a predetermined pulse duration. The output control signal is inputted into the clock input terminal of the flip-flop 401 (the send signal level retainer and the inverted-signal generator). The flip-flop 401 takes in and retains the 1-bit data "0" (the latest signal level of the send signal) at the timing of the falling edge of the output control signal. The flip-flop 401 outputs the obtained data "0" as a signal Q and outputs "1" as a signal Q_ whose level is opposite to that of the send signal level which was sent last (at time t1). The level of the output control signal becomes "1" again after a predetermined time passed (at time t2).

The two-input multiplexer 402 (the selector) outputs the signal Q_ (the opposite signal level with respect to the latest signal level of the send signal) which is the output of the flip-flop 401 if the output control signal which is inputted into the select terminal of the multiplexer is "0". If the output control signal which is inputted into the select terminal of the multiplexer is "1", the two-input multiplexer 402 outputs the signal Q (the latest signal level of the send signal) which is the output of the flip-flop 401 as the send signal.

Accordingly, the output control signal remains "1" in the period from time t0 to time t1. This means that the send signal becomes "0" in that period. While the send signal becomes "1" in the period from time t1 to time t2 because the output control single is "0". It is allowable that a slight hazard is generated in the signal when the send signal is switched.

The output control signal stays "1" in the period when after the time t2 and before the next acknowledge signal is inputted thereby the send signal is "0". That is the value of the 1-bit data which the flip-flop 401 received at the time t1. In this way, the sender communication port can output the send signal in the above-described transaction according to the asynchronous serial communication method which was described with reference to FIG. 2.

The sender communication port operates the following transactions in the same manner as the above-described operation. It follows that the level of the send signal changes again when the acknowledge signal is inputted at time t3.

Configuration of the receiver communication port in the asynchronous serial communication device is now described with reference to FIG. 6 through FIG. 8.

Figure 6:
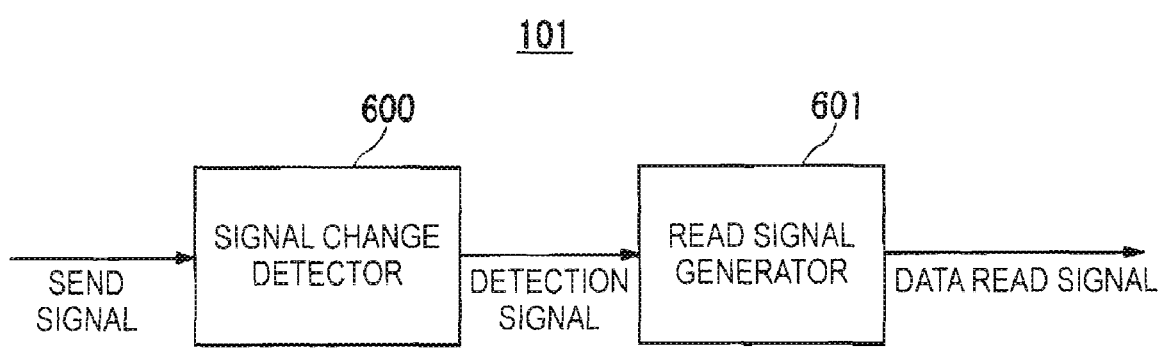
FIG. 6 is a block diagram of a receiver communication port of the asynchronous serial communication device.

FIG. 6 is a block diagram of the receiver communication port of the asynchronous serial communication device. Referring FIG. 6, the reference number 600 denotes a signal change detector and the reference number 601 denotes a read signal generator.

An output terminal of the signal change detector 600 is coupled to an input terminal of the read signal generator 601. The send signal is inputted into an input terminal of the signal change detector 600. A data read signal is outputted from an output terminal of the read signal generator 601. The data read signal is coupled to the unshown asynchronous CPU through an unshown asynchronous bus.

The receiver communication port operates in the following way. The signal change detector 600 detects a change in the signal level of the inputted signal and the detector outputs a detection signal. If the read signal generator 601 reads the detection signal, it, generates and outputs the data read signal after a predetermined time period.

Figure 7:
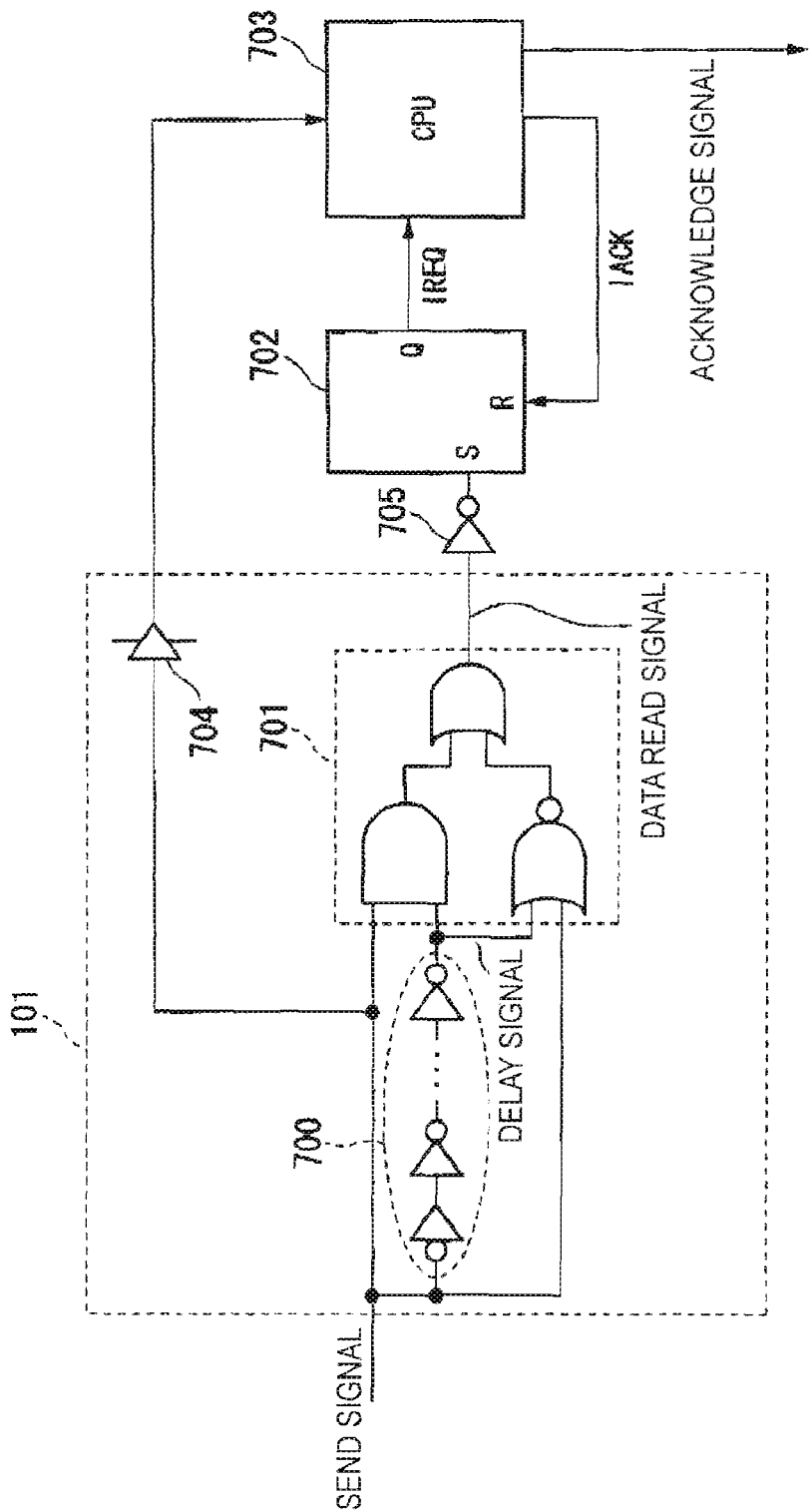
FIG. 7 is a block diagram of the receiver communication port and a data processing part in the asynchronous serial communication device.
Figure 8:
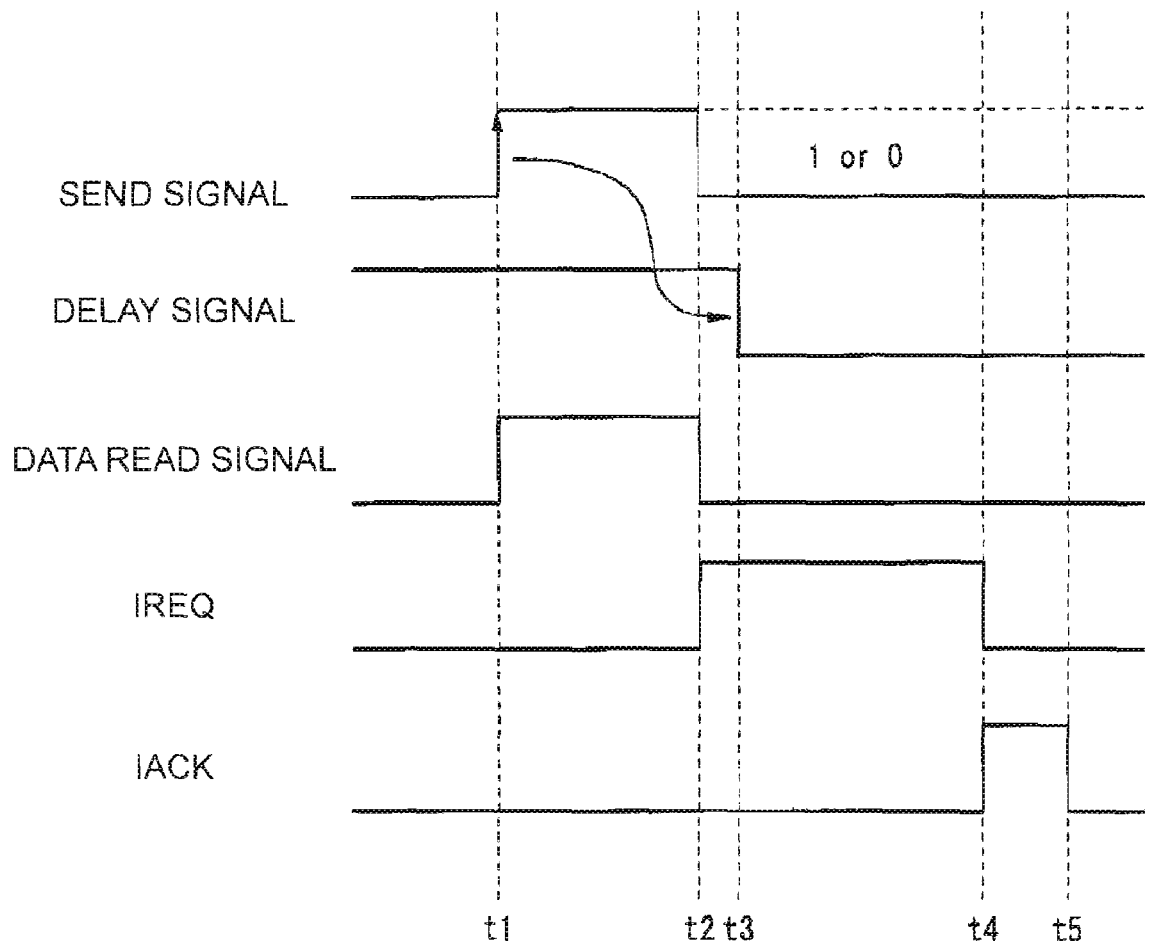
FIG. 8 is a timing chart showing operation of the receiver communication port and the data processing part.

FIG. 7 is a block diagram of the receiver communication port and a data processing part in the asynchronous serial communication device. Referring to FIG. 7, the reference number 700 denotes a delay part, the reference number 701 denotes a logic circuit, the reference number 702 denotes a set-reset flip-flop, the reference number 703 denotes a central processing unit (CPU), the reference number 704 denotes a tristate buffer and the reference number 705 denotes an inverter.

The delay part 700, the logic circuit 701, the tristate buffer 704 and the inverter 705 are included in the receiver communication port 101. The read signal generator 601 which was described above with reference to FIG. 6 here corresponds to the delay part 700 and the logic circuit 700. The signal change detector 600 is not provided here.

The send signal is inputted into an input terminal of the delay part 700, two input terminals of the logic circuit 701 and an input terminal of the tristate buffer 704. An output terminal of the delay part 700 is coupled to other two input terminals of the logic circuit 701. An output of the logic circuit 701 is coupled to an input terminal of the inverter 705. An output of the inverter 705 is coupled to a set terminal of the set-reset flip-flop 702.

An output terminal of the tristate buffer 704 is coupled to the CPU 703. An output terminal and a reset terminal of the set-reset flip-flop 702 are also coupled to the CPU 703. The CPU 703 outputs the acknowledge signal.

Operation of the receiver communication port and the data processing part are described with reference to FIG. 8. FIG. 8 is a timing chart showing the operation of the receiver communication port and the data processing part.

Here, the case where the send signal shifts from "0" to "1" at time t1 and then it changes to "0" which is the 1-bit send data at time t2 will be described. The delay part 700 delays and logically negates the send signal and outputs it as a delay signal. Through this process the delay signal is changed from "1" to "0" at time t3. Accordingly the logic circuit 701 to which the send signal and the delay signal are inputted outputs a data read signal whose level becomes "1" only in the period from the time t1 to the time t2.

Subsequently the data read signal is inverted by the inverter 705 and then inputted into the set terminal of the set-reset flip-flop 702. The set-reset flip-flop 702 then outputs an IREQ signal (an interrupt signal) which shifts to "1" at the time t2.

The CPU 703 to which the IREQ signal is inputted performs a process which saves context. The CPU 703 outputs an JACK signal (an interrupt acknowledge signal) to the reset terminal of the set-reset flip-flop 702 after the saving process has finished and when next data processing becomes possible (in time t4-t5). At this point, a high output impedance state for the tristate buffer 704 is lifted and the buffer outputs the 1-bit send data to the CPU 703. The CPU 703 processes the inputted 1-bit send data and subsequently outputs the acknowledge signal.

While the set-reset flip-flop 702 to which the IACK signal has been inputted is reset, and the IREQ signal becomes "0" at the time t4. The CPU 703 returns to the process before the interruption based on the context which was saved before the interruption.

The same kind of process is performed when the send signal shifts from "1" to "0". The delay time duration shown in the drawing is just an example and it can be longer or shorter.

A structure in which the asynchronous CPU directly controls the sender communication port through the asynchronous bus and sends the send signal is now described with reference to FIG. 9 through FIG. 11.

Figure 9:
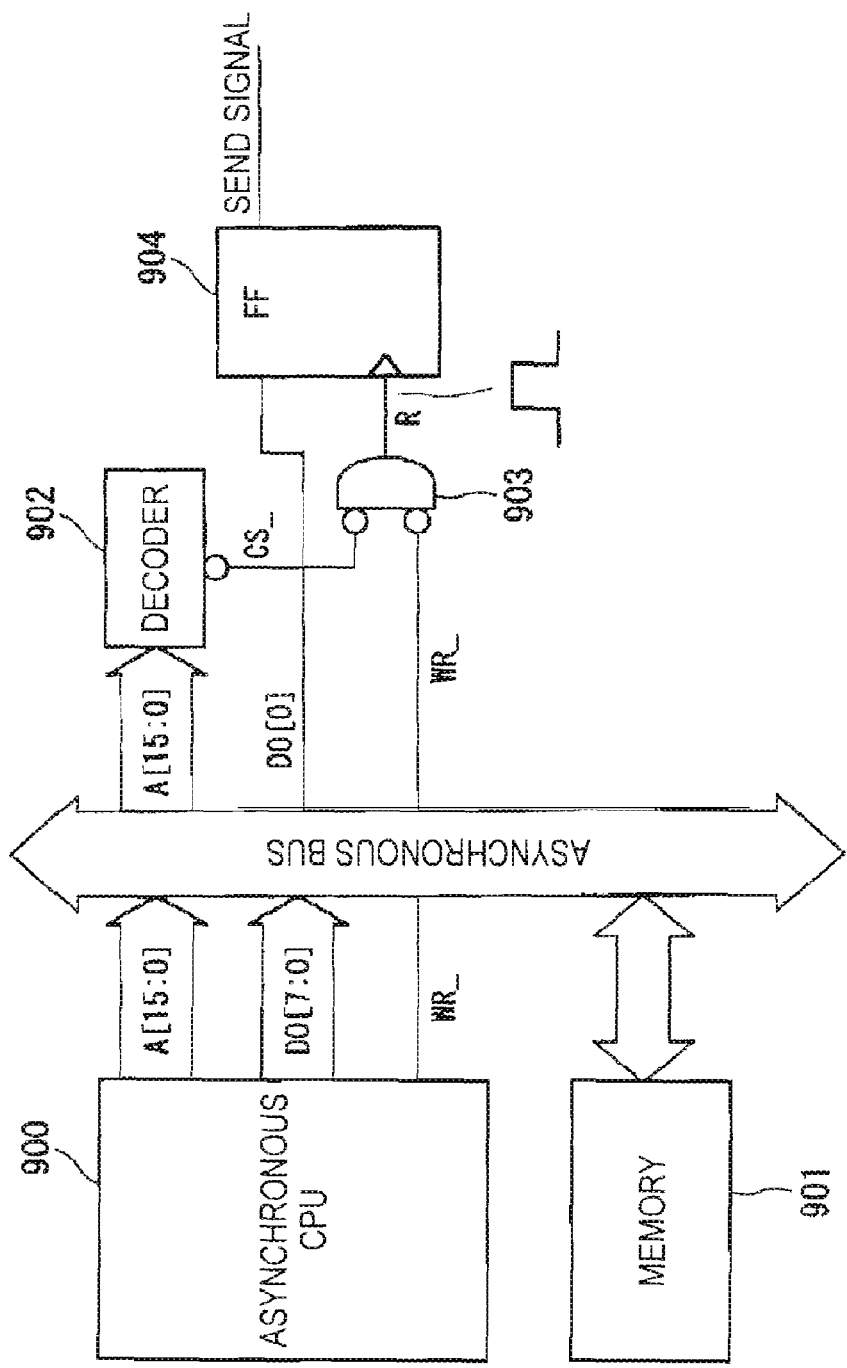
FIG. 9 is a block diagram of the sender communication port which an asynchronous CPU directly controls.
Figure 10:
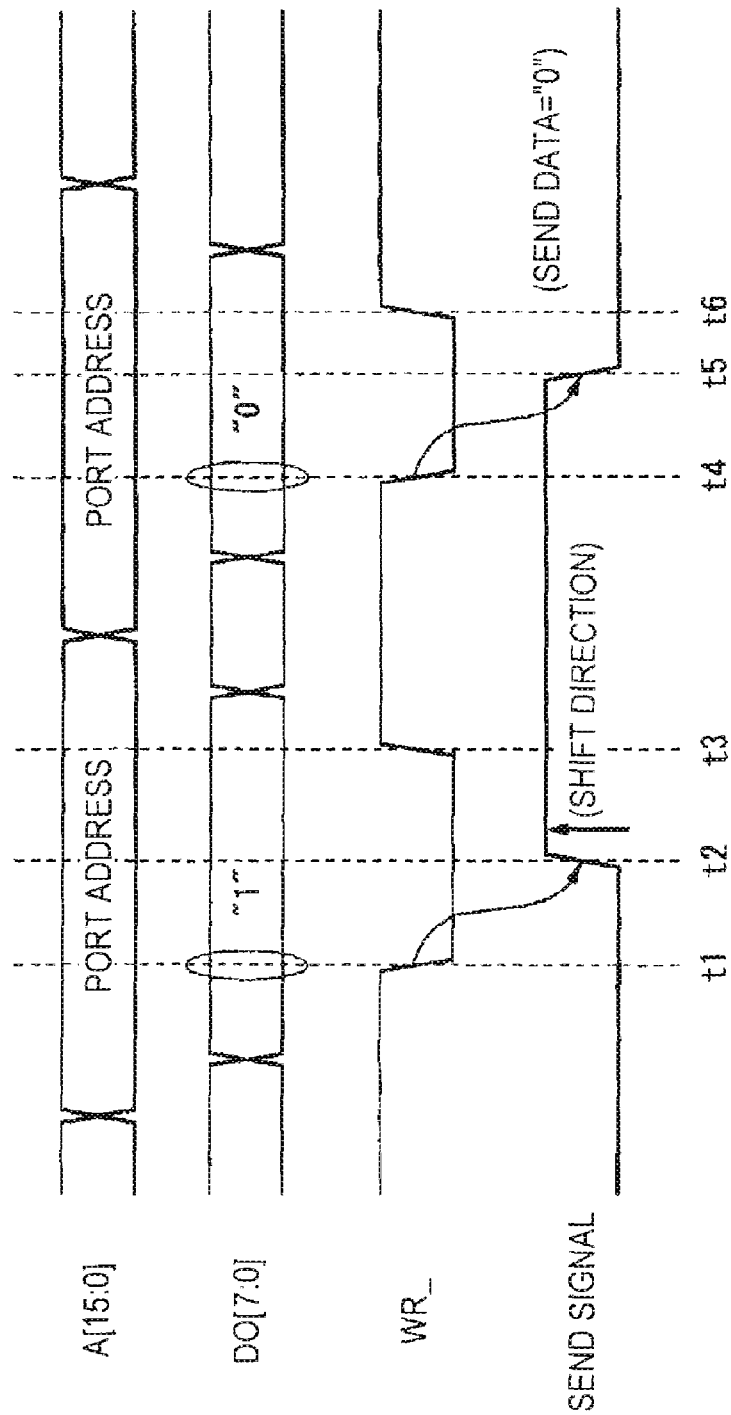
FIG. 10 is a timing chart showing the operation of the sender communication port which is directly controlled by the asynchronous CPU.

FIG. 9 is a block diagram of the sender communication port which the asynchronous CPU directly controls. Referring to FIG. 9, the reference number 900 denotes an asynchronous CPU, the reference number 901 denotes a memory, the reference number 902 denotes a decoder, the reference number 903 denotes a logic circuit and the reference number 904 denotes a flip-flop.

The asynchronous CPU 900 is coupled to the memory 901, the decoder 902, the logic circuit 903 and the flip-flop 904 through the asynchronous bus. More specifically, a port address A [15:0] is coupled to an input terminal of the decoder 902. A data DO [0] which is the least significant bit (LSB) of an 8-bit output data bus DO [7:0] is coupled to an input terminal of the flip-flop 904. A write signal WR_ is coupled to one of input terminals of the logic circuit 903.

An output terminal of the decoder 902 is coupled to the other input terminal of the logic circuit 903, and an output terminal of the logic circuit 903 is coupled to a clock input terminal of the flip-flop 904. An output terminal of the flip-flop 904 outputs the send signal.

Operation of the above-described sender communication port is described with reference to FIG. 10. FIG. 10 is a timing chart showing the operation of the sender communication port which is directly controlled by the asynchronous CPU.

The asynchronous CPU 900 which received an unshown acknowledge signal disables interruption and outputs the address of the sender communication port to which the send signal is to be sent as a port address A [15:0]. At the same time, the asynchronous CPU 900 outputs the 1-bit data of the send data to a predetermined bit of the data DO [7:0]. In the example shown in the drawing the asynchronous CPU 900 outputs the desired 1-bit send data such that data DO [0]="1".

Subsequently, the asynchronous CPU 900 changes the write signal WR_ from "1" to "0" at time t1. At the time t1, the data DO [0] is "1" and a signal CS_ which is a decoded data of the port address A4 [15:0] by the decoder 902 is "0". Accordingly, a data write signal R shifts from "0" to "1" and the flip-flop) 904 loads and holds the data DO [0]="1" at this timing. The flip-flop 904 outputs the send signal "1" at time t2.

The asynchronous CPU 900 then shift s the write signal WR_ from "0" to "1" at time t3. After a predetermined time period past, the asynchronous CPU 900 changes the write signal WR_ from "1" to "0" at time t4.

At the time t4, the asynchronous CPU 900 is outputting 1-bit send data "0" as the data DO [0]. The signal CS_ which is the decoded data of the port address A [15:0] by the decoder 902 is "0" at the time t4. Therefore, the data write signal R changes from "0" to "1" and the flip-flop 904 loads and holds the data DO [0]="0". The flip-flop 904 outputs the send signal "0" at time t5.

In the end of the process, the asynchronous CPU 900 shifts the write signal WR_ from "0" to "1" at time t6, releases the interruption disable, and ends the sending process of the 1-bit signal to a predetermined port.

Through the above-described process, the asynchronous CPU 900 can directly control the sender output port and can send the send signal in accordance with the asynchronous serial communication method of the embodiment.

Figure 11:
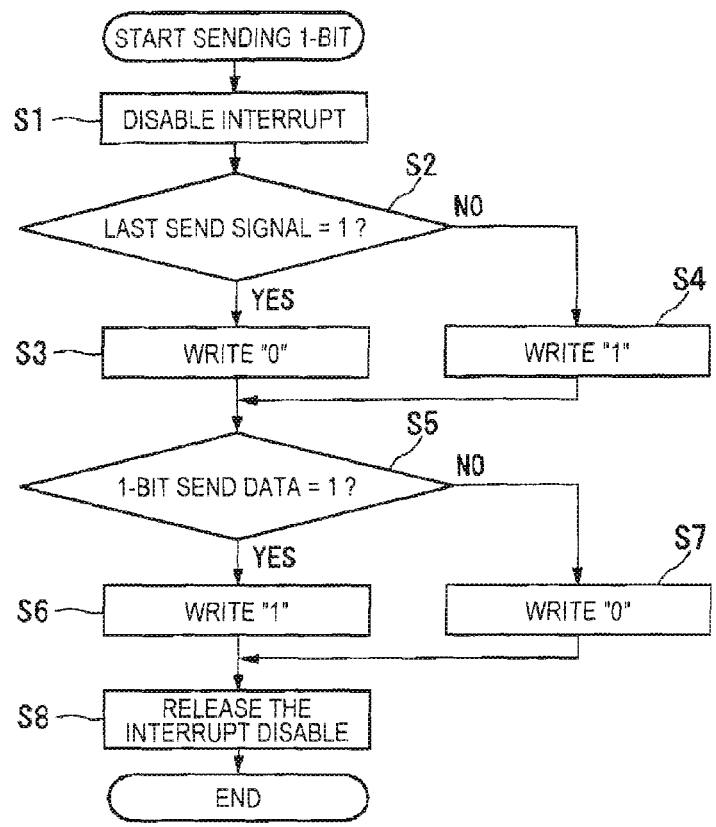
FIG. 11 is a flow chart showing processing of the sender communication port which is directly controlled by the asynchronous CPU.

FIG. 11 is a flow chart showing processing of the sender communication port which is directly controlled by the asynchronous CPU.

When the 1-bit send data is sent, the asynchronous CPU 900 firstly disables interruption (step S1). The asynchronous CPU 900 then determines if the last send signal is "1" or not (step S2). If the last send signal is "1" (the step S2; Yes), the asynchronous CPU 900 writes "0" (step S3). If the last send signal is "0" (the step S2; No), the CPU writes "1" (step S4). The asynchronous CPU 900 then determines if the 1-bit send data is "1" or not (step S5). If the 1-bit send signal is "1" (the step S5; Yes), "1" is written (step S6). If the 1-bit send signal is "0" (the step S5; No), "0" is written (step S7). The asynchronous CPU 900 finally releases the interruption disable (step S8) and ends the sending process of the 1-bit signal.

Though the sender communication port and the receiver communication port are coupled each other through a single data line in the above-described example, these can be coupled through a plurality of data lines and a send signal consisting of more than one bit can be simultaneously transmitted. An example of such case using the plurality of data lines will be now described with reference to FIG. 12.

Figure 12:
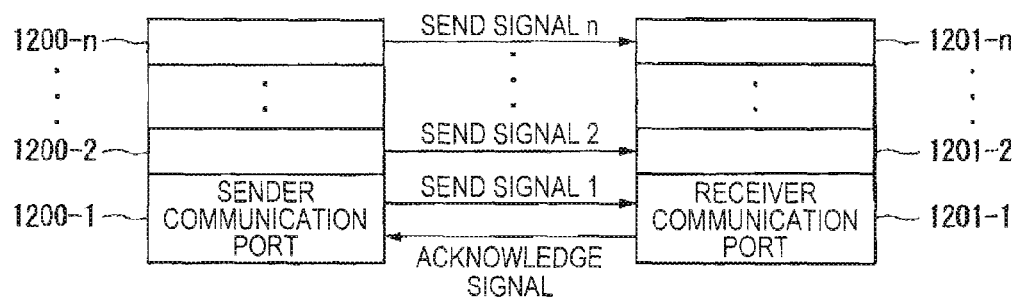
FIG. 12 is a block diagram of an asynchronous serial communication device which performs communication in which a plurality of bits is simultaneously sent.

FIG. 12 is a block diagram of the sender communication port of the asynchronous serial communication device. Referring to FIG. 12, the reference numbers 1200-1 through 1200-n denote the sender communication ports, and the reference numbers 1201-1 through 1201-n denote the receiver communication ports.

The sender communication port 1200-1 is coupled to the receiver communication port 1201-1 through a data wire (communication wire) through which a send signal 1 is transmitted and a acknowledge wire through which an acknowledge signal is transmitted. The sender communication port 1200-2 is coupled to the receiver communication port 1201-2 through a data wire (communication wire) through which a send signal 2 is transmitted. The sender communication port 1200-n is coupled to the receiver communication port 1201-n through a data wire (communication wire) through which a send signal n is transmitted. Other sender communication ports are respectively coupled to the corresponding receiver communication ports through each data wire. The sender communication ports 1200-1 through 1200-n (second sender communication ports) are the sender communication ports that have the same function. The receiver communication ports 1201-1 through 1201-n (second receiver communication ports) are the receiver communication ports that has the same function. Here, "n" is a positive number more than 1.

Operation of this asynchronous serial communication device is now described. The sender communication port 1200-1 and the receiver communication port 1201-1 perform communication in accordance with the above-described asynchronous serial communication method according to the embodiment of the invention. Each of the sender communication ports 1200-2 through 1200-n sends an independent 1-bit send data (second send data) concurrently with the sender communication port 1200-1. The 1-bit send data are respectively fed into the receiver communication ports 1201-2 through 1201-n concurrently with the receiver communication port 1201-1. Thereby; it is possible to perform a multi-bit communication with such simple circuit configuration.

The communication can be performed when at least one sender communication port 1200-1 and one receiver communication port 1201-1 that perform communication according to the above-described asynchronous serial communication method are provided. However, more than one sender communication port and more than one receiver communication port may be provided.

Two cases in which communication is performed by using other means than the voltage level will be now described with reference to FIG. 13 and FIG. 14.

Figure 13:
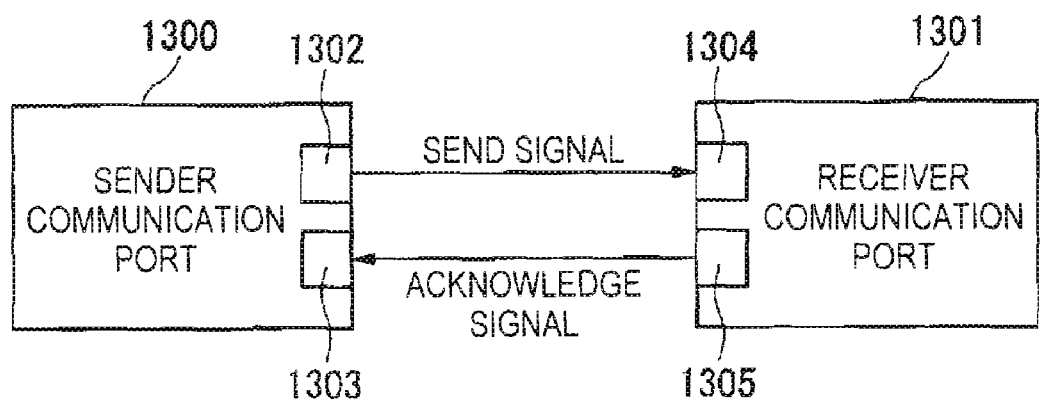
FIG. 13 is a block diagram of an asynchronous serial communication device which conducts communication by using an optical signal.

FIG. 13 is a block diagram of an asynchronous serial communication device which conducts communication by using an optical signal. Referring to FIG. 13, the reference number 1300 denotes a sender communication port, the reference number 1301 denotes a receiver communication port, the reference number 1302 denotes a sender optical output unit, the reference number 1303 denotes a sender optical detector, the reference number 1304 denotes a receiver optical detector and the reference number 1305 denotes a receiver optical output unit.

The sender optical output unit 1302 provided in the sender communication port 1300 is coupled to the receiver optical detector 1304 which is provided in the receiver communication port 1301. The receiver optical output unit 1305 provided in the receiver communication port 1301 is coupled to the sender optical detector 1303 which is provided in the sender communication port 1300. Communication wires used here are cables such as a fiber-optic cable through which an optical signal can be transmitted. Alternatively, an optical signal can be transmitted in space without using communication wires.

The sender communication port 1300 and the receiver communication port 1301 perform communication in accordance with the above-described asynchronous serial communication method according to the embodiment of the invention. The send signal is transformed into an optical signal by the sender optical output unit 1302, and the outputted optical signal is then detected by the receiver optical detector 1304. In this way, the communication is performed. In the same manner, the acknowledge signal is transformed into an optical signal by the receiver optical output unit 1305, and the outputted optical signal is then detected by the sender optical detector 1303. In this case, the above-described signal level with reference to FIG. 2 corresponds to the intensity of light, and the signal level "1" corresponds to "on" in the optical signal and the signal level "0" corresponds to "off" in the optical signal.

Figure 14:
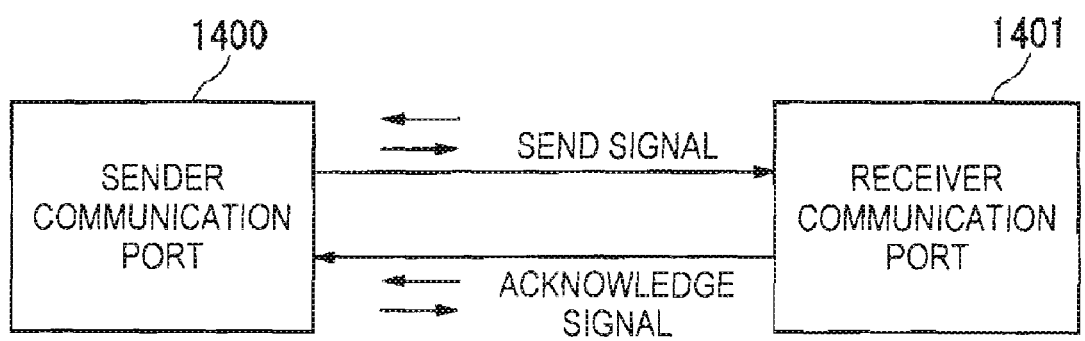
FIG. 14 is a block diagram of an asynchronous serial communication device which conducts communication by using electric current.

FIG. 14 is a block diagram of an asynchronous serial communication device which conducts communication by using electric current. Referring to FIG. 14, the reference number 1400 denotes a sender communication port and the reference number 1401 denotes a receiver communication port.

The sender communication port 1400 and the receiver communication port 1401 perform communication in accordance with the above-described asynchronous serial communication method according to the embodiment of the invention. In this case, the send signal and the acknowledge signal are transformed into electric current whose flowing direction corresponds one-on-one to the above-described signal level with reference to FIG. 2. Referring to FIG. 14, the signal level "1" corresponds to the left-direction electric current and the signal level "0" corresponds to the right-direction electric current. It follows that the signal level corresponds to the direction of the electric current.

A case where more than one receiver communication port is used is now described with reference to FIG. 15 and FIG. 16.

Figure 15:
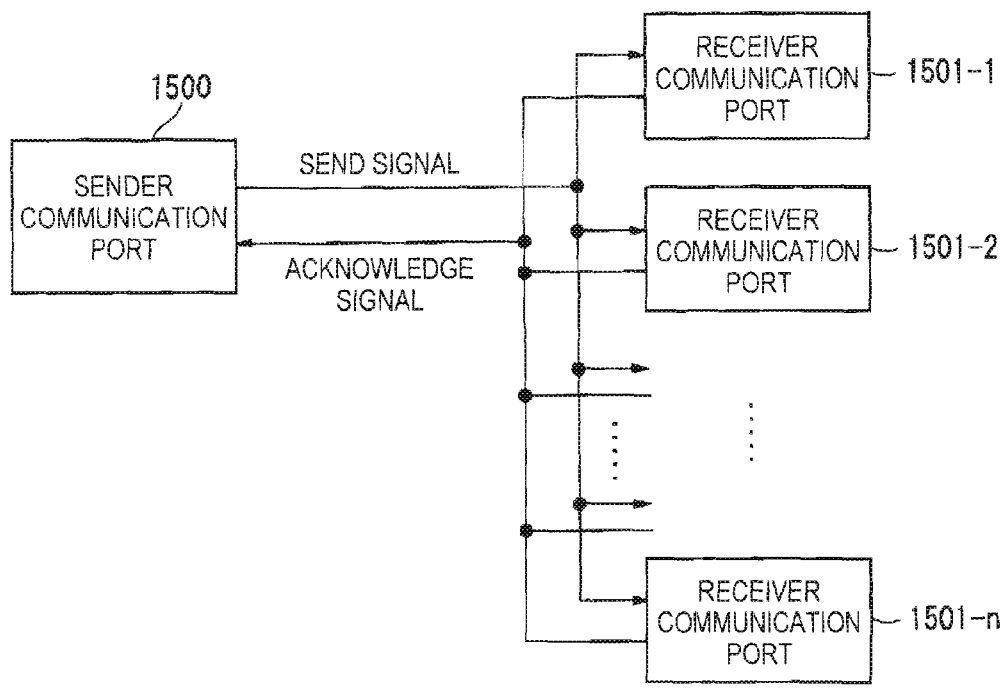
FIG. 15 is a block diagram of an asynchronous serial communication device which conducts a point to multipoint communication.

FIG. 15 is a block diagram of an asynchronous serial communication device which conducts a point-to-multipoint communication. Referring to FIG. 15, the reference numbers 1500 denote the sender communication ports, and the reference numbers 1501-1 through 1501-$n$ denote the receiver communication ports.

The sender communication port 1500 is coupled to the receiver communication ports 1501-1 through 1501-$n$ through a data wire and a acknowledge wire. The sender communication port 1500 and the receiver communication ports 1501-1 through 1501-$n$ perform communication in accordance with the above-described asynchronous serial communication method according to the embodiment of the invention. In this way, the point-to-multipoint communication can be performed.

In this case, the sender communication port 1500 may send a packet and the receiver communication port 1501 may receive the packet.

Figure 16:
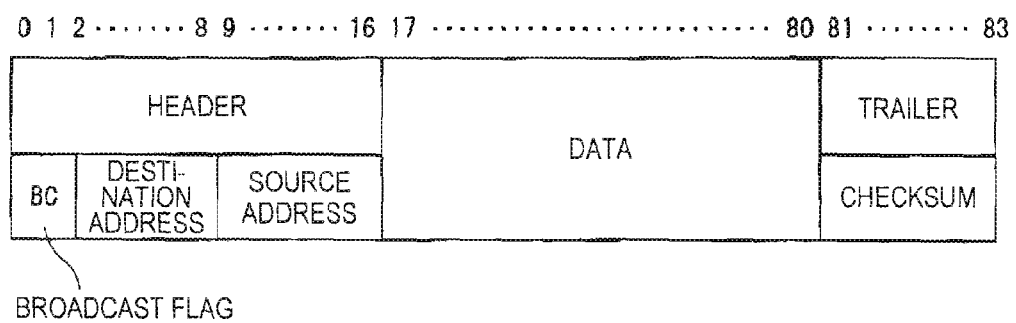
FIG. 16 shows a structure of a packet.

FIG. 16 shows a structure of a packet. Referring to FIG. 16, the packet at least includes a source address, a destination address, a broadcast flag, data and checksum. In this case, the communication may be performed in such a way that each of the receiver communication ports 1501-1 through 1501-$n$ continues its receiving operation only when its address matches the destination address or when the flag is on.

Second Embodiment

A second embodiment of the invention is now described with reference to FIG. 17.

Figure 17:
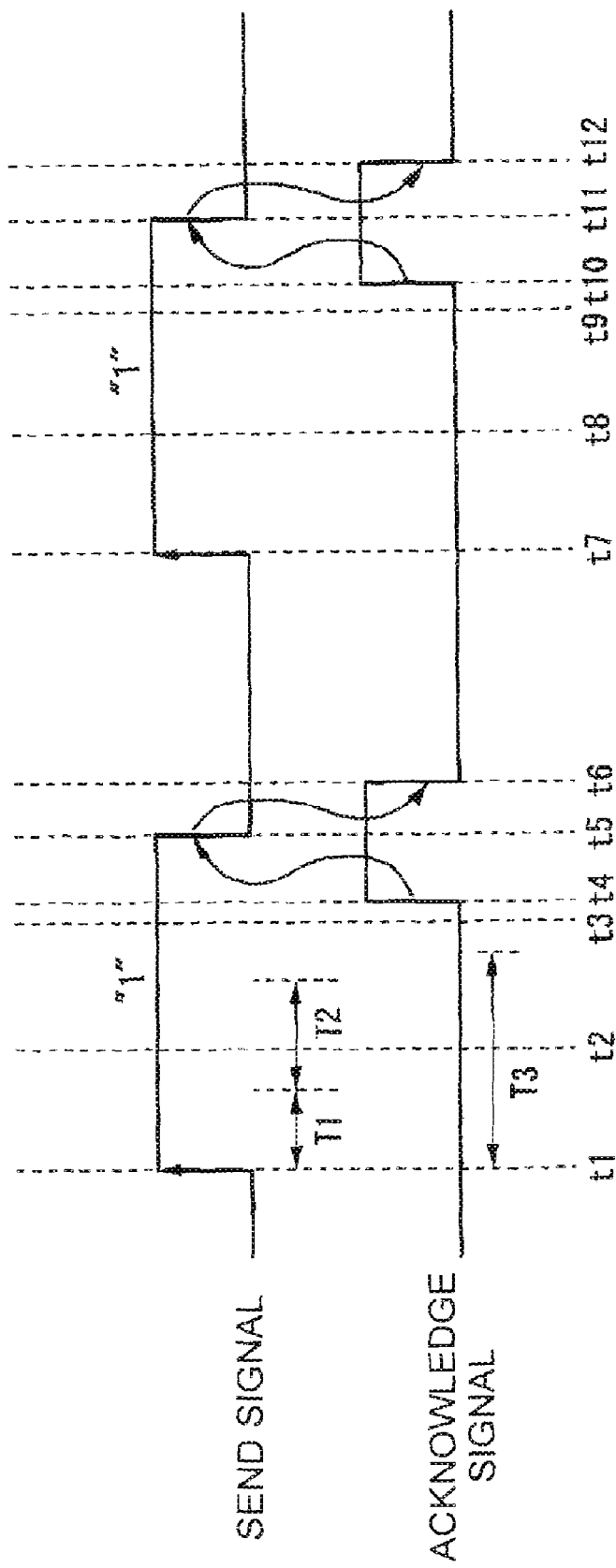
FIG. 17 is a wave form diagram of the send signal and the acknowledge signal showing an asynchronous serial communication method according to a second embodiment.

FIG. 17 is a wave form diagram of the send signal and the acknowledge signal which are sent in accordance with an asynchronous serial communication method according to the second embodiment of the invention. FIG. 17 shows a send signal sent by the sender communication port 100 and a acknowledge signal sent by the receiver communication port 101.

The sender communication port 100 firstly shifts the signal level of the send signal from "0" to "1" (a predetermined level) (at time t1). At this point, the receiver communication port 101 detects the signal level shift of the send signal.

The sender communication port 100 retains the signal level "1" of the send signal for a predetermined time period (the first time period T1) or a longer time period, and it then transmits a 1-bit send data within a predetermined time period (the second time period T2). In the example shown in FIG. 17, the sender communication port 100 holds the signal level "1" of the send signal till time t2 and then sends the 1-bit send data "1" at the time t2.

After the receiver communication port 101 detects the signal level shift of the send signal (from "0" to "1") at the time t1, the receiver communication port 101 loads the above-mentioned 1-bit send data "1" after a predetermined time (the third time period T3, where (T3>T1+T2) has past from the time t1 (at the time t3). The acknowledge signal is then shifted to "1" (at the time t4). The acknowledge signal shift changes the send signal level to "0" (at the time t5).

This send signal change to "0" shifts the acknowledge signal level to "0" (at time to). Through the above-described process, sending and receiving of the 1-bit send data has been completed.

Subsequently, sending and receiving of a 1-bit send data resumes when the sender communication port 100 shifts the signal level of the send signal from "0" to "1" (time t7 through t12).

Though the 1-bit send data is sent after the sender communication port 100 shifts the signal level of the send signal from "0" to "1" in the embodiment, the 1-bit send data canAbe sent after the sender communication port 100 shifts the signal level of the send signal from "1" to "0". In the same way as the first embodiment, the asynchronous serial communication device which performs communication in accordance with an asynchronous serial communication method according to the second embodiment can also be formed.

Furthermore, after the receiver communication port 101 detected the signal level change in the send signal at the time t1, the receiver communication port 101 may load the 1-bit send data when a predetermined time (a third time T3) passes in the both first and second embodiments. Moreover, the asynchronous CPU may directly control the receiver communication port 101.

The invention is obviously not limited to the specific embodiments described herein, but also encompasses any variations that may be considered by any person skilled in the art) within the general scope of the invention. For example, the case where the 1-bit send data is sent through a data wire can be changed into the case where a plurality of bits is simultaneously sent through a plurality of data wires as described above with reference to FIG. 12.

What is claimed is:

1. An asynchronous serial communication method, comprising:

a sender transmitting a one bit of serial data consecutively by firstly making a signal transition on the data line, secondly putting the one bit of serial data on the data line after a predetermined time T1 yet before another predetermined time T1+T2, the signal transition being from LOW to HIGH, or from HIGH to LOW, based on a value of a previous one bit of data, and a receiver receiving the one bit of serial data by firstly detecting the signal transition on the data line and secondly capturing the one bit of serial data after a predetermined time T3 (where T3>T1+T2), the receiver transmitting an acknowledgment signal to the sender after the receiver captures the one bit of serial data.

2. An asynchronous serial communication method, comprising:

a sender transmitting a one bit of serial data by firstly changing a signal level of the data line from a default level to the opposite level and then putting the one bit of serial data on the data line after a predetermined time T1 yet before another predetermined time T1+T2; and a receiver receiving the one bit of serial data by firstly detecting the signal transition on the data line and secondly capturing the one bit of serial data after a predetermined time T3 (where T3>T1+T2), the receiver transmitting an acknowledgment signal to the sender after the receiver captures the one bit of serial data.

3. An asynchronous serial communication device, comprising:

a sender transmitting a one bit of serial data by firstly making a signal transition on the data line, secondly putting the one bit of serial data on the data line after a predetermined time T1 yet before another predetermined time T1+T2, the signal transition being from LOW to HIGH, or from HIGH to LOW, based on a value of a previous one bit of data, and a receiver receiving the one bit of serial data by firstly detecting the signal transition on the data line and secondly capturing the one bit of serial data after a predetermined time T3 (where T3>T1+T2), wherein the sender communication port and the receiver communication port are coupled each other through a single data line the receiver transmitting an acknowledgment signal to the sender after the receiver captures the one bit of serial data.

4. An asynchronous serial communication device, comprising:
a sender transmitting a one bit of serial data by firstly changing a signal level of the data line from a default level to the opposite level and then putting the one bit of serial data on the data line after a predetermined time T1 yet before another predetermined time T1+T2; and
a receiver receiving the one bit of serial data by firstly detecting the signal transition on the data line and secondly capturing the one bit of serial data after a predetermined time T3 (where T3>T1+T2), the receiver transmitting an acknowledgment signal to the sender after the receiver captures the one bit of serial data
a communication port of the sender and a communication port of the receiver being coupled to each other through a single data line.

5. An asynchronous serial communication device that performs communication through a plurality of data lines, comprising:
a sender communication port transmitting a word of serial multi-bit data by firstly making a signal transition on a designated data line among the data lines, secondly putting a word of serial multi-bit data on the data lines after a predetermined time T1 yet before another predetermined time T1+T2, the signal transition being from LOW to HIGH, or from HIGH to LOW, based on a value of a previous one bit of data;
a receiver communication port receiving a word of serial multi-bit data by firstly detecting the signal transition on the designated data line among the data lines and secondly capturing a word of serial multi-bit data on the data lines after a predetermined time T3 (where T3>T1+T2), the receiver communication port transmitting an acknowledgment signal to the sender communication port after the receiver communication port captures the one bit of serial data.

6. An asynchronous serial communication device that performs communication through a plurality of data lines, comprising:
a sender communication port transmitting a word of serial multi-bit data by firstly changing a signal level of a designated data line among a plurality of data lines from a default level to the opposite level, secondly putting a word of serial multi-bit data on the data lines after a predetermined time T1 yet before another predetermined time T1+T2;
a receiver communication port receiving a word of serial multi-bit data by firstly detecting the signal transition on the designated data line among the data lines and secondly capturing a word of serial multi-bit data on the data lines after a predetermined time T3 (where T3>T1+T2), the receiver communication port transmitting an acknowledgment signal to the sender communication port after the receiver communication port captures the one bit of serial data.

7. An asynchronous serial communication device, comprising:
a sender communication port transmitting a one bit of serial data by firstly making a signal transition on the data line, secondly putting the one bit of serial data on the data line after a predetermined time T1 yet before another predetermined time T1+T2, the signal transition being from LOW to HIGH, or from HIGH to LOW, based on a value of a previous one bit of data.

8. An asynchronous serial communication device, comprising:
a sender communication port transmitting a one bit of serial data by firstly changing a signal level of the data line from a default level to the opposite level and then putting the one bit of serial data on the data line after a predetermined time T1 yet before another predetermined time T1+T2, the sender communication port receiving an acknowledgement signal after transmitting the one bit of serial data.

9. An asynchronous serial communication device, comprising:
a receiver communication port receiving the one bit of serial data by firstly detecting the signal transition on the data line and secondly capturing the one bit of serial data after a predetermined time T3 (where T3>T1+T2), the signal transition being from LOW to HIGH, or from HIGH to LOW, based on a value of a previous one bit of data.

10. The asynchronous serial communication device according to claim 3, the sender communication port including:
a send signal level retainer retaining the signal level of the send signal that was sent last;
an inverted-signal generator generating the opposite signal level to the signal level of the send signal that was sent last;
an output control signal generator generating an output control signal that has a predetermined pulse duration from an inputted sender port write signal; and
a selector selecting and outputting either the signal level of the send signal that was sent last or the opposite signal level depending on the output control signal.

11. The asynchronous serial communication device according to claim 3, the receiver communication port including:
a signal change detector outputting a detection signal if the signal change detector detects the signal level change; and
a read signal generator generating a data read signal in a predetermined time after receiving the detection signal from the signal change detector.

12. The asynchronous serial communication device according to claim 3, further comprising:
a central processing unit (CPU) controlling the sender communication port and the receiver communication port.

13. The asynchronous serial communication device according to claim 3, further comprising:
an optical output unit; and
an optical detector, wherein the signal level is an intensity of light.

14. The asynchronous serial communication device according to claim 3,
the signal level being a direction of electric current.

15. The asynchronous serial communication device according to claim 3,
the receiver communication port being provided in a plural number, the sender communication port being coupled to the plurality of the receiver communication ports through a communication wire and the asynchronous serial communication device performing a point-to-multipoint communication.

16. The asynchronous serial communication device according to claim 15,
the sender communication port sending a packet that includes a destination address, a broadcast flag and data, and the receiver communication port receiving the packet.

17. The asynchronous serial communication device according to claim 16,
the receiver communication port continuing and completing the receiving operation only when an address of the receiver communication port matches the destination address or when the broadcast flag is on.

* * * * *